(12) United States Patent
Minkoley et al.

(10) Patent No.: US 10,809,120 B2
(45) Date of Patent: Oct. 20, 2020

(54) WIM SENSOR COMPRISING ACCELERATION SENSORS AND METHOD FOR DEFLECTION AND PRESENCE MEASUREMENT USING THE SAME

(71) Applicant: Kistler Holding AG, Winterthur (CH)

(72) Inventors: Dennis Minkoley, Winterthur (CH); Biruk Hailesilassie, Urdorf (CH)

(73) Assignee: KISTLER HOLDING, AG, Winterthur (CH)

( * ) Notice: Subject to any disclaimer, the term of this patent is extended or adjusted under 35 U.S.C. 154(b) by 146 days.

(21) Appl. No.: 16/207,859

(22) Filed: Dec. 3, 2018

(65) Prior Publication Data

US 2019/0186982 A1 Jun. 20, 2019

(30) Foreign Application Priority Data

Dec. 15, 2017 (EP) ..................... 17207625

(51) Int. Cl.
*G01G 19/02* (2006.01)
*G01G 23/10* (2006.01)
(Continued)

(52) U.S. Cl.
CPC ............. *G01G 19/024* (2013.01); *G01G 3/13* (2013.01); *G01G 23/10* (2013.01); *G01L 1/04* (2013.01)

(58) Field of Classification Search
CPC ........ G01G 19/024; G01G 23/10; G01G 3/13; G01L 1/04
(Continued)

(56) References Cited

U.S. PATENT DOCUMENTS 4,793,429 A * 12/1988 Bratton ..................... G01G 3/13
177/1
9,304,032 B2 4/2016 Cornu et al.
(Continued)

FOREIGN PATENT DOCUMENTS

CN 1821725 8/2006
CN 102928057 A 2/2012
(Continued)

OTHER PUBLICATIONS

Japanese Office Action and Translation, dated Jan. 9, 2020, 16 pages.
(Continued)

*Primary Examiner* — Nimeshkumar D Patel
*Assistant Examiner* — Jean F Morello
(74) *Attorney, Agent, or Firm* — Dority & Manning, P.A.

(57) ABSTRACT

A WIM system for detecting loads of vehicles on a roadway segment when a crossing wheel of a vehicle crosses a WIM sensor includes a WIM sensor arranged in the roadway segment and having a section that is flush with the roadway surface. The WIM sensor includes an elongated profile extending along a longitudinal axis and defining at least one space in which is arranged at least one force sensor, which is configured to generate a force sensor signal that corresponds to a dynamic ground reaction force to the crossing wheel. The WIM system includes at least one acceleration sensor that detects an acceleration of the road surface of the roadway segment in which the WIM sensor is arranged in at least one spatial direction and that accordingly provides an acceleration sensor signal indicative of the deflection of the roadway segment along the one spatial direction.

18 Claims, 5 Drawing Sheets

(51) Int. Cl.
*G01G 3/13* (2006.01)
*G01L 1/04* (2006.01)

(58) Field of Classification Search
USPC .......................................................... 73/818
See application file for complete search history.

(56) References Cited

U.S. PATENT DOCUMENTS

| | | |
|---|---|---|
| 9,347,816 B2 | 5/2016 | Cornu et al. |
| 9,488,517 B2 | 11/2016 | Cornu et al. |
| 9,804,017 B2 | 10/2017 | Cornu et al. |
| 9,851,241 B2 | 12/2017 | Hofmann et al. |
| 2011/0127090 A1 | 6/2011 | Vijayaraghavan et al. |
| 2013/0024152 A1* | 1/2013 | Hofmann ............... G01G 23/01 702/101 |
| 2014/0190753 A1 | 7/2014 | Mian et al. |
| 2014/0345955 A1 | 11/2014 | Cornu et al. |
| 2016/0187183 A1* | 6/2016 | Cornu ................. G08G 1/02 177/132 |
| 2017/0097278 A1 | 4/2017 | Kobayashi |

FOREIGN PATENT DOCUMENTS

| | | |
|---|---|---|
| CN | 206313683 U | 7/2017 |
| JP | S60108717 | 2/1985 |
| JP | 2001/083000 | 3/2001 |
| JP | 2012018149 | 3/2001 |
| JP | 2002523767 | 7/2002 |
| JP | 2003511661 | 3/2003 |
| JP | 2017067723 | 4/2017 |
| KR | 10-0985734 | 10/2010 |
| KR | 100985734 B1 | 10/2010 |
| KR | 20150081586 A | 7/2015 |
| WO | WO0012975 | 3/2000 |
| WO | WO0125733 | 4/2001 |

OTHER PUBLICATIONS

European Search Report, EP 17207625.9-1001, dated Jul. 2, 2018, 14 pages.
Korean Intellectual Property Office, Office Action, English Translation, Application No. 10-2018-0158873, dated Oct. 14, 2019, 4 pages.
Chinese Office Action, dated Jun. 24, 2020.

* cited by examiner

WIM SENSOR COMPRISING ACCELERATION SENSORS AND METHOD FOR DEFLECTION AND PRESENCE MEASUREMENT USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The invention relates to a WIM system comprising at least a WIM sensor and at least an acceleration sensor for analyzing the condition of a roadway and for increasing measurement accuracy.

BACKGROUND

Weigh-in-Motion, briefly WIM, systems are used in the field of transport for determining the total load or the axle load of a vehicle or for determining the number of crossings of axles or vehicles over a roadway segment. For this purpose, a WIM system is not limited to consisting of at least a WIM sensor and at least an evaluation element. A roadway segment refers to a roadway comprising a road surface, a road sublayer as well as an area alongside the roadway. On the basis of the detected numbers and/or axle loads of vehicles measures may be initiated which are inter alia appropriate for preventing a damage to the roadway due to overload, determining use-dependent maintenance intervals for the roadway, determining payments depending on the total load or the axle load or the number of axles of a vehicle, and increasing traffic safety.

WIM sensors are embedded in the road surface of a roadway segment and in a longitudinal direction with respect to the direction of travel a track of a vehicle is crossed by several WIM sensors that are inserted in the road surface next to each other in the direction of travel so that one WIM sensor each crosses a wheel track of a vehicle wherein the WIM sensor is arranged in the surface of the roadway segment flush with the road surface of that roadway segment. Generally, the WIM sensor is formed as an elongated profile. The wheel track refers to the trajectory of a wheel of the vehicle on the road surface when the vehicle traverses. By track is meant the totality of all wheel tracks of the vehicle. Also, an embodiment is known in which the complete track of the vehicle is crossed by a single elongated WIM sensor.

Usually, at least one force sensor is arranged in the WIM sensor for determining the load of a wheel or axle. Upon application of a force, for example due to a wheel load of a crossing wheel, the force sensor outputs a force sensor signal.

The determination of the load of a wheel is performed by measuring dynamic ground reaction forces when a wheel crosses by means of at least one force sensor and by measuring the speed of a wheel. The ground reaction force means the force that counteracts a force exerted by a wheel on the ground. The speed is usually calculated on the basis of the transit time between two WIM sensors spaced apart in the direction of travel of the wheel.

The determination of the load of the wheel is falsified due to a resonance of the road surface and/or road sublayer in which the WIM sensor is inserted. Thus, a soft road surface or road sublayer will result in a strong resonance of the road surface or road sublayer so that a lower force will be detected compared to a firmer, rigid underground or road surface. Hereinafter, the resonance of the underground will be referred to as deflection wherein the deflection indicates how strongly the road surface or road sublayer is deflected from a resting position, said resting position being the position of the road sublayer or road surface without any load acting thereon.

Furthermore, also the costs of a WIM system play an increasingly important role. It is demanded that the maintenance intervals will be as long as possible and, as a result of the trend of interconnecting a plurality of WIM systems, that the WIM sensors will function as autonomously as possible.

A WIM sensor is known from U.S. Pat. No. 5,265,481A, which is hereby incorporated herein by this reference for all purposes, and includes a plurality of piezoelectric measuring elements, briefly referred to as piezoelements, arranged in a hollow profile in a longitudinal direction; wherein the piezoelements are connected to a signal processing unit so that it is possible to electrically contact an individual piezoelement or a group of piezoelements in parallel; wherein a piezoelement consists of piezo discs arranged between force introduction segments. In the hollow profile laterally next to a piezoelement may be arranged electronic components, such as a preamplifier, which contact the piezoelement or the group of piezoelements. This allows adapting of the local measurement sensitivity of the associated piezoelement or -elements by means of the preamplifier to the environment in which the WIM sensor is arranged. Due to this adaptation, also referred to as calibration, the measurement accuracy of a WIM sensor is increased as compared to a calibration after production without considering the environment in which the WIM sensor will be arranged.

A disadvantage is, however, that the calibration is performed by a calibration vehicle and must be repeated in regular intervals in order to restore the original measurement accuracy.

In real operation, the measurement accuracy of the WIM sensor decreases continuously due to a change in the deflection of the road surface and the road sublayer that occurs in normal operation, for example due to aging, wear or changes in the temperature of the road surface or road sublayer.

OBJECTS AND BRIEF SUMMARY OF THE INVENTION

One of the objects of the present invention is to provide a WIM system that evaluates the condition of the road surface of a roadway segment by analyzing the deflection of the road surface of the roadway segment. Another object is to increase the accuracy of the WIM system by analyzing the deflection of the road surface.

These objects and others are achieved by the features described below.

The invention relates to a WIM system for determining wheel loads of vehicles on a roadway segment during the passage of a wheel of a vehicle over a WIM sensor that is arranged in the roadway segment inserted in the road surface flush with the surface of the roadway. The WIM sensor is more or less formed as an elongated profile extending along a longitudinal axis and comprising at least one space in which is arranged at least one force sensor. That force sensor generates a force sensor signal that corresponds to a dynamic ground reaction force to the vehicle wheel that is crossing an elongated profile. At least one acceleration sensor detects an acceleration of the road surface of the roadway segment in which the WIM sensor is arranged in at least one spatial direction which it provides as the acceleration sensor signal.

A load is a weight force, briefly force, exerted by an object on an underground. Accordingly, a wheel load is a force exerted by a wheel of a vehicle on a roadway; and an axle load is a force exerted by all wheels of an axle of a vehicle on a roadway.

The ground reaction force and, thus, the determination of the load of a wheel, briefly wheel load, is dependent on the deflection of the road surface in the vicinity of a WIM sensor arranged in the roadway segment and of the road sublayer below this WIM sensor. Deflection refers to a reversible displacement of an object from an equilibrium position under the action of a force. The deflection behavior describes the deflection of an object relative to a force acting thereon. Also, the amount by which the road surface and the road sublayer deflect may change even when the same force acts thereon, for example due to aging or wear of the road surface and the road sublayer. Therefore, the change in deflection of the road surface and road sublayer directly influences measurement accuracy. In the following, measurement accuracy refers to the accuracy of the measurement of a force exerted by a wheel of a vehicle traveling over a piezoelectric measuring element of a WIM sensor.

Due to its wheel load, a wheel of a vehicle traveling on a roadway segment along a direction of travel generates a dynamic deflection of the roadway segment, which deflection is propagated in the roadway segment in the form of a pressure wave. In this respect, the positive direction of travel is the direction of travel of the wheel. Furthermore, a deflection of the roadway surface is generated in front of the moving wheel in the positive height direction that extends perpendicularly to the road surface. In this respect, the positive height direction is the direction from the roadway surface towards the vehicle. At the point where the wheel contacts the roadway surface there is a deflection of the roadway surface in the negative height direction.

Due to the dynamic movement of the wheel across the roadway surface a dynamic deflection occurs which is accompanied by an acceleration of the road surface and the road sublayer. Accelerations both in the direction of travel and in the height direction occur.

Due to the dynamic deflection a pressure wave propagates in the road surface comprising an acceleration component of in the direction of travel of a wheel.

It should be understood that all accelerations of the road surface also affect elements introduced in the road surface such as a WIM sensor or acceleration sensor inserted therein. An acceleration sensor that is advantageously arranged in the WIM sensor or in the roadway segment detects this acceleration and provides it as the acceleration sensor signal in the height direction as well as the acceleration sensor signal in the direction of travel.

The acceleration sensor signal is evaluated in a microprocessor and deflection parameters are calculated. These deflection parameters are utilized for calibrating at least one force sensor signal so that the deflection of the underground has no effect on the measurement result.

Furthermore, the deflection parameters are stored and a time course of the parameters is evaluated over a defined period of time. In this way, changes in the deflection behavior related to wear, aging may be detected, and a maintenance of the roadway segment may be initiated.

BRIEF DESCRIPTION OF THE DRAWINGS

In the following, the invention will be explained referring to the Figures in which.

DETAILED DESCRIPTION OF EXEMPLARY EMBODIMENTS OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. It is contemplated that those skilled in the art will readily discern that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations.

Figure 1:
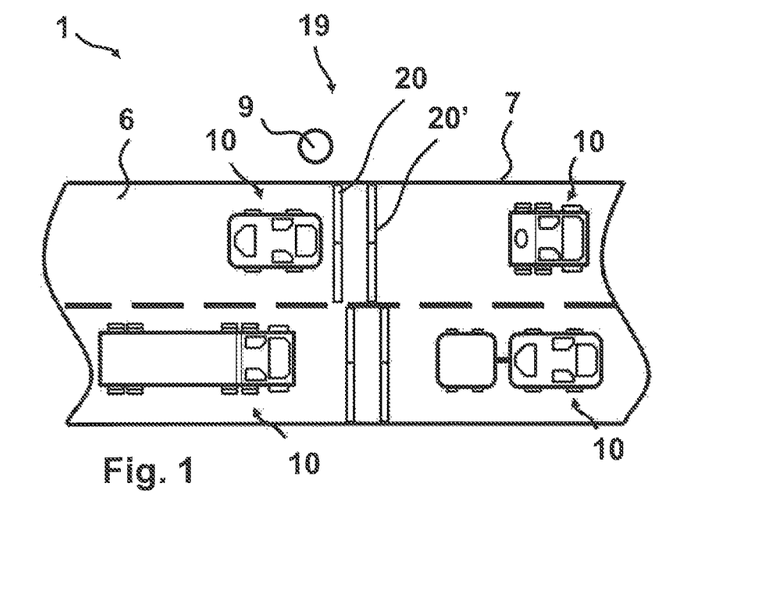
FIG. 1 shows a schematic partial view of a roadway segment with WIM sensors arranged in the roadway segment.

FIG. 1 shows a roadway segment 1 with a presently preferred embodiment of a WIM system 19 for determining a wheel load of a vehicle 10. Advantageously, in the embodiment shown there is a housing 9 next to the roadway.

Figure 7:
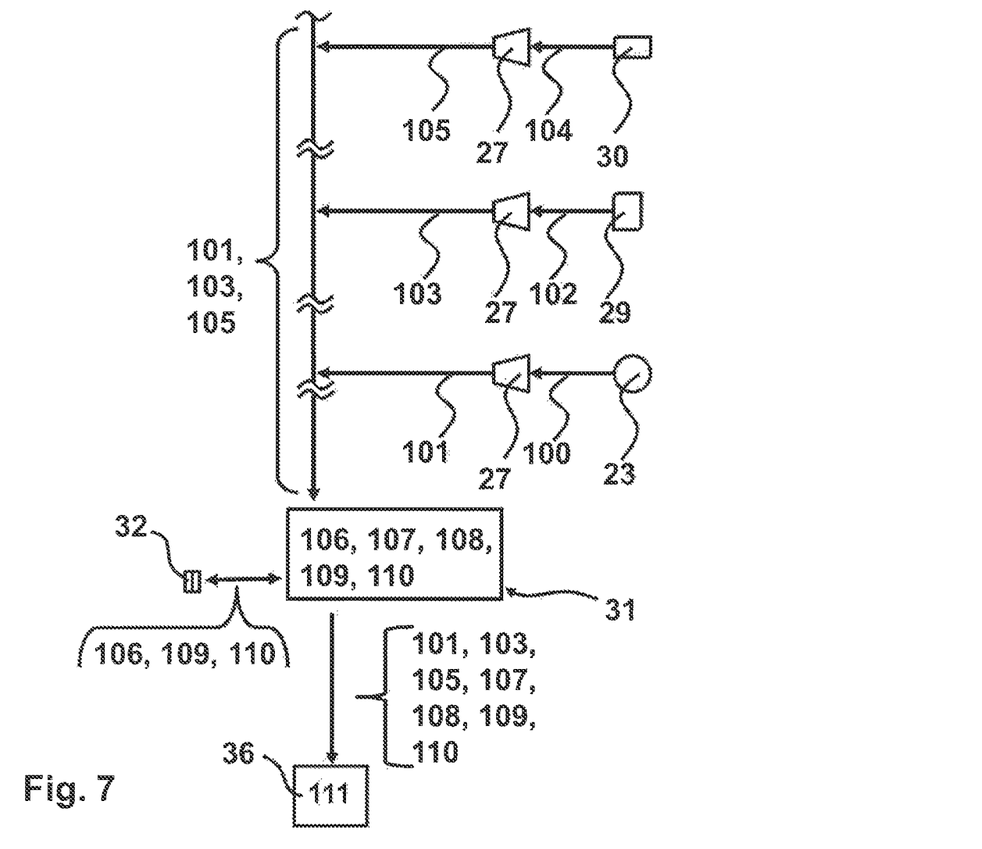
FIG. 7 shows a schematic representation of the signals of a WIM sensor in a presently preferred embodiment wherein, for comprehensibility, individual components of the WIM sensor are also shown schematically in the representation.

In a presently preferred embodiment, a WIM system 19 includes an arrangement of at least two WIM sensors 20 in a roadway segment 1 on a wheel track, at least one acceleration sensor 29 (e.g., FIGS. 4 and 7) on a wheel track, at least one microprocessor 31 (e.g., FIG. 7), at least one non-volatile memory element 32 (e.g., FIG. 7), and at least one external evaluation element 36 (e.g., FIG. 7).

Examples of devices with capabilities for carrying out the functions required to be performed by an external evaluation element 36 include a laptop computer or a personal computer or a decentralized IT infrastructure. In a presently preferred embodiment, the external evaluation element 36 is arranged in one of the following positions: in the housing 9 schematically depicted in FIG. 7 or at any position outside of the roadway segment 1.

Figure 2:
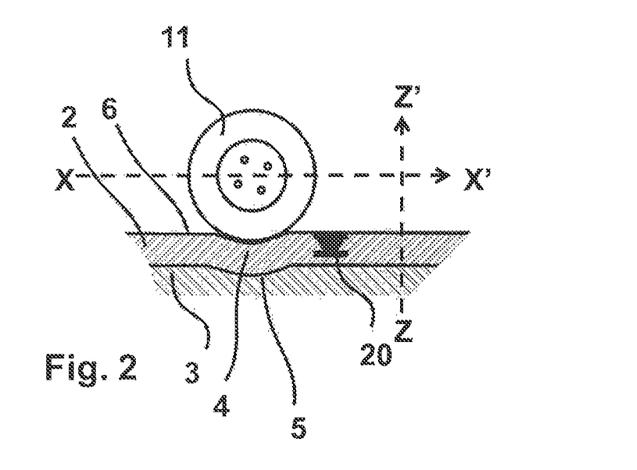
FIG. 2 shows a schematic sectional view of a portion of a roadway segment in a presently preferred embodiment with a wheel of a vehicle and a WIM sensor.

FIG. 2 shows a sectional view of a roadway segment 1 in a presently preferred embodiment with a WIM sensor 20 arranged therein. The roadway of the roadway segment 1 is shown in a simplified manner and consists of an upper road layer 2 that lies above and is supported by a road sublayer 3. The WIM sensor 20 is arranged in the roadway segment 1 to be flush with the roadway surface 6, which is the surface of the upper road layer 2 exposed to the atmosphere and which is disposed opposite the surface of the upper road layer 2 that lies in contact with the road sublayer 3.

Figure 3:
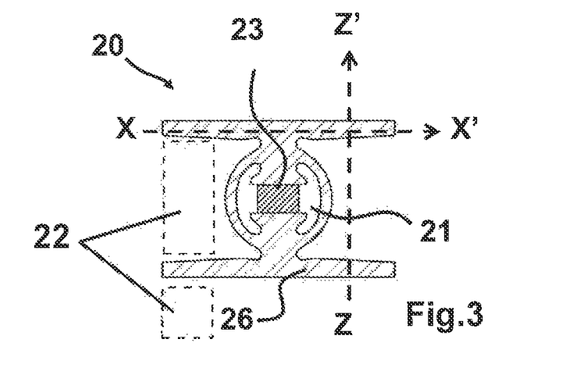
FIG. 3 shows a presently preferred embodiment of a portion of a WIM sensor in a schematic sectional view cut in a plane that is perpendicular to the longitudinal axis YY' of FIG. 4.
Figure 4:
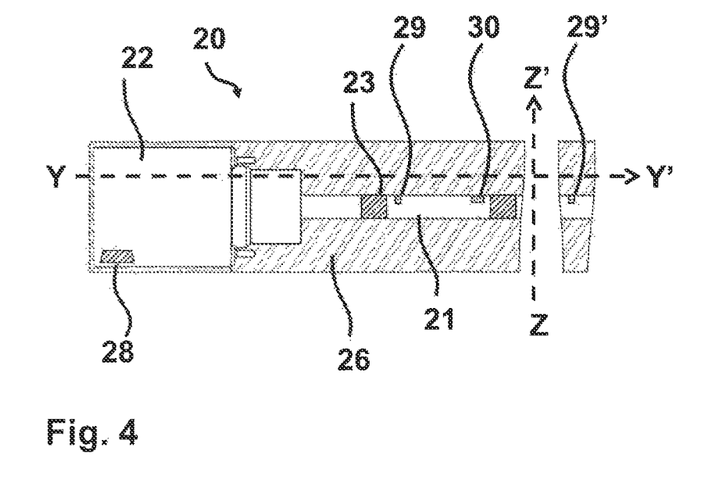
FIG. 4 shows another schematic sectional view cut in a plane that is parallel to the longitudinal axis YY' of a presently preferred embodiment of a portion of a WIM sensor.
Figure 8:
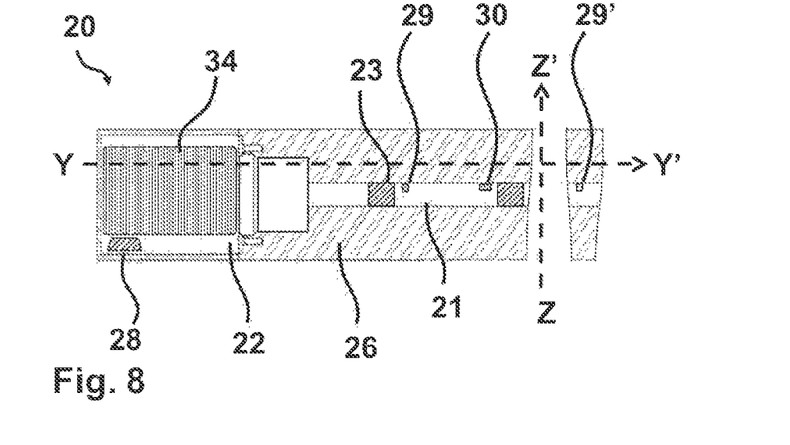
FIG. 8 shows a schematic sectional view of another embodiment of a portion of a WIM sensor with power supply.
Figure 11:
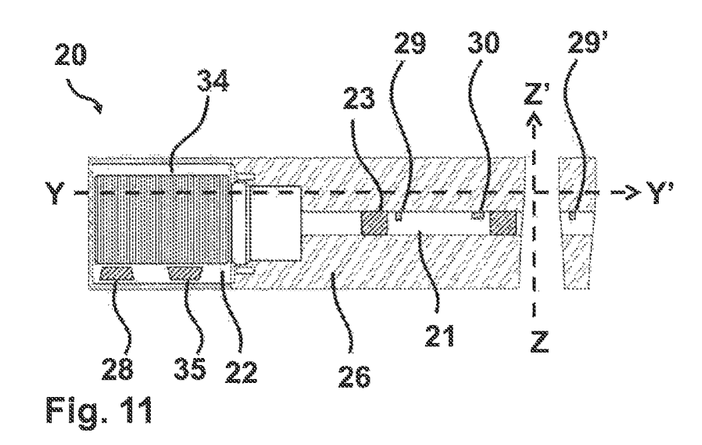
FIG. 11 shows a schematic sectional view of another embodiment of a portion of a WIM sensor with energy harvesting circuit.

As shown in FIG. 1, each WIM sensor 20 and 20' is formed as an elongated profile 26 that defines a hollow interior and an exposed exterior. As schematically shown in the transverse cross-sectional view of FIG. 3, one or more spaces 21, 22 are defined with respect to the profile 26. One such by space 21 shown in FIG. 3 is a volume that is entirely enclosed by the profile 26 and extends over the entire or part of the longitudinal axis YY' of the profile 26. Another such space 22 schematically shown in FIG. 3 by the dashed rectangle is a volume that is partially enclosed by the envelope of the profile 26 and similarly extends over the entire or part of the longitudinal axis YY' of the profile 26 and is next to the exterior of the profile 26 in the transverse direction XX'. As schematically shown in FIGS. 4, 8 and 11, a space 22 may be arranged contiguous with an end of the profile 26 with respect to the longitudinal axis YY'. Moreover, a space 22 schematically shown in FIG. 3 by the dashed square may be disposed below the profile 26 in the direction of the height axis ZZ' of the profile.

As schematically shown in FIG. 3 and FIG. 4 for example, at least one force sensor 23 is disposed in the space 21 and configured for determining a wheel load or axle load, which causes the force sensor 23 to generate and provide force sensor signals 100, which are schematically shown in FIG. 7 for example.

As used herein, "providing a signal" is to be understood as meaning that the signal provided is available for further use. Therefore, "providing a signal" also comprises storing the signal in an electronic memory and retrieving the signal from that memory. "Providing a signal" also includes displaying the signal on a display.

In a presently preferred embodiment, a force sensor 23 includes at least one piezoelectric measuring element with electrodes and at least one charge amplifier. The piezoelectric measuring element generates an electric charge when a force is applied to the piezoelectric measuring element. The electrodes transmit that charge from the piezoelectric measuring element to the charge amplifier, which converts the charge into a force sensor signal 100. Accordingly, the force sensor signal 100 is an electrical signal, preferably an electrical voltage.

It should be understood that those skilled in the art may also choose a different embodiment of a force sensor 23 such as a strain gauge or a piezoresistive measuring element or a different measuring element comprising or not an electric amplifier or similar electric circuit which under the action of a force generates a signal that corresponds to the force and outputs this signal as a force sensor signal 100.

In an advantageous embodiment, the force sensor 23 has a sensitivity that causes generation of the charge in response to a force that acts in a direction that is more or less perpendicular to the roadway surface 6 (FIG. 2) and perpendicular to the transverse (or horizontal) axis XX' schematically shown in FIG. 3 and that acts in a direction that is parallel to the height axis ZZ' that is shown schematically in FIG. 4.

FIG. 7 shows a schematic representation of the signals of a WIM system 19 together with the components of the WIM system important for understanding the invention.

Advantageously, at least one acceleration sensor 29 is arranged in the roadway segment 1, as shown in FIG. 4. The acceleration sensor 29 detects accelerations in one spatial direction, which in FIG. 4 is schematically indicated as a vertical direction ZZ', and provides the accelerations of the roadway segment 1 in the one spatial direction as the acceleration sensor signal 102.

In a presently preferred embodiment, the acceleration sensor 29 is arranged in the space 21, 22, as shown schematically in FIG. 4.

Figure 9:
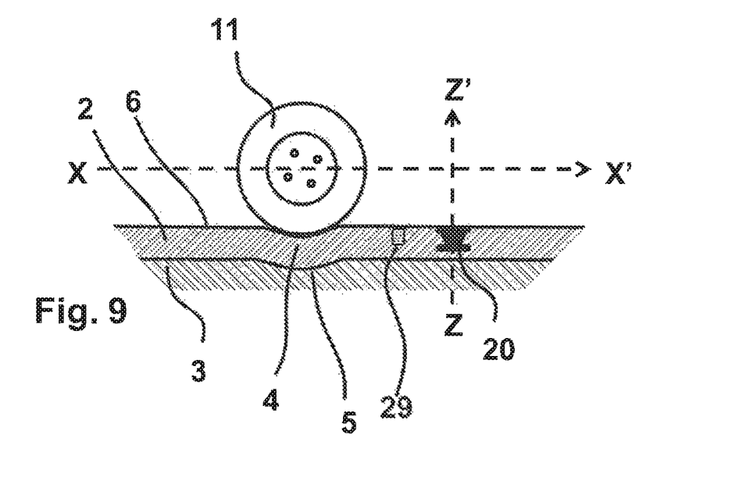
FIG. 9 shows a portion of a roadway segment in a further presently preferred embodiment with a wheel of a vehicle, an acceleration sensor and a WIM sensor.

In another presently preferred embodiment, at least one acceleration sensor 29 is arranged in the upper road layer 2 spaced apart from the profile 26 in a direction perpendicular to the transverse axis XX' of the profile 26 and including an upper surface lying flush with the roadway surface 6, as schematically shown in FIG. 9.

Figure 10:
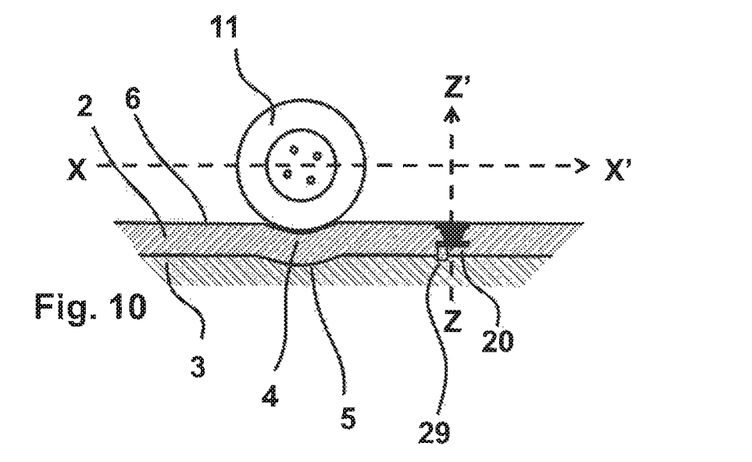
FIG. 10 shows a portion of a roadway segment in a further presently preferred embodiment with a wheel of a vehicle, an acceleration sensor and a WIM sensor.

In a further presently preferred embodiment, at least one acceleration sensor 29 is arranged below the profile 26 with respect to the height axis ZZ', as schematically shown in FIG. 10.

The longitudinal axis YY' of the profile 26 as well as the Y direction along the longitudinal axis YY' are given by the fact that the X direction, Y direction and Z direction form an orthogonal system.

In a presently preferred embodiment, electrical and electronic components, briefly referred to as electronic elements, are arranged in the roadway segment 1. These electronic elements desirably are configured for converting a force sensor signal 100 into a digital force sensor signal 101 and for "providing" this digital force sensor signal 101 in the sense that "providing" is described above. Moreover, these electronic elements desirably are configured for converting at least one acceleration sensor signal 102 into a digital acceleration sensor signal 103 and for "providing" this digital acceleration sensor signal 103 for further use in the sense that "providing" is described above.

In a presently preferred embodiment, the electronic elements include at least one of the following elements: force sensor 23, acceleration sensor 29, temperature sensor 30, A/D converter 27, signal transmission element 28. Yet this list of electronic elements does not exclude the possibility of other components.

In a presently preferred embodiment, at least one A/D converter 27 is arranged in one of the following positions: in one of the spaces 21, 22 or in the housing 9.

It should be understood that electronic elements with different functions may also be present in the form of a single electronic component such as for example an application-specific integrated circuit, which is also known by the acronym ASIC. Furthermore, a plurality of electronic elements with similar functions may also be employed in the form of a single electronic component.

Advantageously, the WIM system 19 includes at least one temperature sensor 30 that is arranged in the roadway segment 1. In embodiments schematically shown in FIGS. 4, 7, 8 and 11 for example, a temperature sensor 30 can be carried by a WIM sensor 20. The temperature sensor 30 is configured to detect a temperature and desirably "provides" the detected temperature as a temperature sensor signal 104 as shown schematically in FIG. 7. In a presently preferred embodiment, the temperature sensor 30 is arranged in one of the spaces 21, 22 of a WIM sensor 20. In an alternative embodiment not separately represented in the Figures, the temperature sensor 30 is arranged in the upper road layer 2 separate from the location of a WIM sensor 20 in the upper road layer 2.

Additionally, at least one A/D converter 27 is advantageously arranged in the roadway segment 1. The A/D converter 27 is configured to convert at least one temperature sensor signal 104 into a digital temperature sensor signal 105 and "provides" this signal, as shown schematically in FIG. 7.

In a presently preferred embodiment, at least two acceleration sensors 29, 29' are arranged in the roadway segment 1 as schematically depicted in FIGS. 4, 8 and 11. A first acceleration sensor 29 of the two paired acceleration sensors 29, 29' is configured to detect an acceleration in the direction of travel of a crossing wheel 11, also referred to as X direction along the transverse axis XX'. A second acceleration sensor 29' of the two paired acceleration sensors 29, 29' is configured to detect an acceleration in the height direction, also referred to as the Z direction along the vertical axis ZZ', as shown in FIGS. 4, 8 and 11 with reference to a presently preferred embodiment. The acceleration sensor signals 102 are "provided" as a digital acceleration sensor signal 103 in the X direction (e.g., FIG. 7) and a digital acceleration sensor signal 103 in the Z direction, respectively.

When a vehicle 10 travels on the roadway segment 1, the wheel load of the crossing wheel 11, which is the vehicle's wheel that is crossing the WIM sensor 20 in the X direction as schematically shown in FIGS. 2, 9 and 10 for example, causes a dynamic deflection of the upper road layer 2 and the road sublayer 3 represented respectively as deformations 4, 5 in FIGS. 2, 9 and 10. In accordance with the present invention, each such dynamic deflection can be measured as an acceleration.

Figure 5:
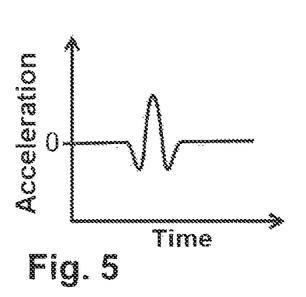
FIG. 5 shows a schematic diagram of the acceleration signal in the height direction in relation to time when a wheel crosses.

FIG. 5 graphically depicts a typical acceleration sensor signal 102 of an acceleration in the Z direction of the upper road layer 2 during crossing of a wheel 11 as the magnitude of that signal (vertical axis) varies in relation to time (horizontal axis).

In a presently preferred embodiment, as shown schematically in FIG. 7, at least one microprocessor 31 and at least one non-volatile memory element 32 desirably are arranged in the roadway segment 1. In a presently preferred embodiment, the microprocessor 31 is arranged in one of the following positions: in one of the spaces 21 in the WIM sensor 20 or one of the spaces 22 next to or below the WIM sensor 20 or in the housing 9.

Advantageously, as schematically shown in FIG. 7, the digital acceleration sensor signal 103 is recorded and evaluated in the microprocessor 31 with at least an associated digital force sensor signal 101 and at least an associated digital temperature sensor signal 105. A digital acceleration sensor signal 103 is associated with a digital force sensor signal 101 if it was generated by the same wheel 11. A digital temperature sensor signal 105 is associated with a digital force sensor signal 101 if the digital temperature sensor signal 105 was detected within one minute of the detection of the digital force sensor signal 101. The association of a digital acceleration sensor signal 103 with a digital force sensor signal 101 and of a digital temperature sensor signal 105 with a digital force sensor signal 101 is determined by an algorithm, as shown schematically in FIG. 7.

At least one digital acceleration sensor signal 103 is evaluated by means of a first algorithm that desirably is stored on the non-volatile memory element 32 and that is loaded into the microprocessor 31. The first algorithm compares the digital acceleration sensor signal 103 in the Z direction and the digital acceleration sensor signal 103 in X direction to at least a characteristic signature for a presence of an crossing wheel 11 in the vicinity of the acceleration sensor 29, 29' and generates a presence information 107 therefrom. A characteristic signature is at least one known and previously defined amplitude of the digital acceleration sensor signal 103 stored in the non-volatile memory element 32. The characteristic signature is loaded into the microprocessor 31. As shown schematically in FIG. 7, if the first algorithm that compares the loaded characteristic signature to the digital acceleration sensor signal 103 finds a match, then a presence of a wheel 11 on the acceleration sensor 29, 29' is detected and the first algorithm generates a positive presence information 107. If there is no match or if there is no longer a match, then the first algorithm generates a negative presence information 107.

Figure 6:
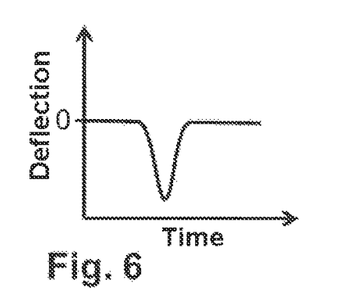
FIG. 6 shows a schematic diagram of the deflection signal calculated from the acceleration sensor signal of FIG. 5.

A second algorithm calculates the deflection of the upper road layer 2 from the digital acceleration sensor signal 103 in the Z direction and provides this calculation as deflection information 109. In this respect, the deflection of the upper road layer 2 is the digital acceleration sensor signal 103 with time in which an acceleration in a positive Z direction or a negative Z direction occurs integrated twice. A typical deflection of the upper road layer 2 in relation to time is shown in FIG. 6. The deflection information 109 is a mathematical function having time as a variable and can be represented at least as a polynomial (for example a Taylor polynomial) of finite degree with one coefficient for each power of the variable that has time as a variable. The second algorithm provides the polynomial of the deflection information 109 with the coefficients as the deflection parameters 110. The deflection parameters 110 are provided by the second algorithm.

It should be understood that those skilled in the art may also choose a representation of the deflection information 109 different from a mathematical function. The skilled artisan may determine deflection parameters 110 for each function which are introduced in the mathematical function as mathematical parameters of the function and provide the deflection information 109 using the variable (time).

By means of the second algorithm, the deflection parameters 110 are introduced in another mathematical function having the digital force sensor signal 101 as a variable and forming and providing a corrected force sensor signal 108. The additional mathematical function minimizes the effect of the deflection of the road surface and the road sublayer 3 on the measurement accuracy of the force sensor 23. The force sensor 23 has a predominant sensitivity in a direction perpendicular to the roadway surface 6 and parallel to the height direction ZZ'. The deflection of the upper road layer 2 and the road sublayer 3 in the height direction ZZ' is made available in the form of deflection information 109 or deflection parameters 110 by the acceleration sensor 29 arranged in the roadway segment 1 and having sensitivity in the height direction ZZ'. The second algorithm introduces the deflection parameters 110 into the additional mathematical function. On the basis of a predetermined relationship between the force detected and the deflection of the upper road layer 2 and the road sublayer 3, the mathematical function is chosen so that using the deflection parameters 110 the chosen mathematical function minimizes the effect of the deflection of the upper road layer 2 and the road sublayer 3 on the corrected force sensor signal 108. In this way, the resonance of the upper road layer 2 or road sublayer 3 under the action of a force can be prevented from biasing the determination of the wheel load.

The additional mathematical function is preferably determined as an interpolation polynomial using polynomial interpolation known from numerical mathematics. In this respect, at first defined forces are applied on the road surface above the acceleration sensor and on the WIM sensor. The interpolation polynomial is the function resulting in the forces exerted using the digital force sensor signal 101 as a variable.

By means of the corrected force sensor signal 108, the effect of the deflection of the upper road layer 2 on the determination of the wheel load is minimized, which thereby increases the measurement accuracy of the WIM system 19.

In an advantageous embodiment, before the corrected force sensor signal 108 is obtained, the effect of temperature on the digital force sensor signal 101 is corrected by means of a known temperature relationship of the force sensor 23 stored on the non-volatile memory element 32. Here, the temperature relationship is a temperature-dependent factor that is multiplied by the digital force sensor signal to obtain this correction. Correcting of the temperature relationship of a digital force sensor signal 101 on the basis of the temperature of the force sensor 23 is a method that is known for a long time and will not be further discussed herein.

As shown schematically in FIG. 7, the determination of the wheel load is carried out in an external evaluation element 36 on the basis of at least a corrected force sensor signal 108 and the velocity of a crossing wheel 11. The velocity of the crossing wheel 11 is calculated by an algorithm in the external evaluation element 36 on the basis of the transit time of the wheel 11 between two WIM sensors 20, 20' spaced apart in the roadway segment 1 in the direction of travel (XX') of the wheel 11.

In the embodiments schematically shown in FIGS. 4, 8 and 11, the WIM Sensor 20 comprises an electronic signal transmission element 28. In a first embodiment, the electronic signal transmission element 28 of the WIM Sensor 20 includes a connection element for a conductor that is configured and used for transmitting the signals provided in the WIM sensor 20 to an external receiver. In a second embodiment, the signal transmission element 28 includes a transmitter and receiver for electromagnetic waves so that the signal transmission element 28 transmits signals provided in the WIM sensor 20 by means of electromagnetic waves to an external receiver. An external receiver may be an A/D converter 27 or microprocessor 31 arranged in the housing, for example. An external receiver also may be an external evaluation element 36.

In further embodiments of the WIM system 19, a power supply 34 is arranged in or adjacent the roadway segment 1 and is configured to supply electrical energy to at least one electronic element arranged in the roadway segment 1 and desirably multiple electronic elements arranged in the roadway segment 1. In one presently preferred embodiment schematically shown in FIG. 1, a power supply 34 is arranged in the housing 9 next to the roadway segment 1. In other presently preferred embodiments schematically shown in FIGS. 8 and 11, a power supply 34 is disposed in the space 22 at one end of the profile 26. However, in still other embodiments of the WIM system 19, a power supply 34 is arranged in the space 21 within the profile 26 to supply electrical energy to at least the electronic elements schematically depicted in FIG. 7.

In some embodiments of the WIM system 19, the power supply 34 is the only source of electrical energy of the WIM system 19. In other embodiments, the power supply 34 is an additional source of electrical energy of the WIM system 19, for example an uninterruptible power supply or a general substitute power supply. When the power supply 34 is provided as a general substitute power supply, then the power supply 34 is configured to start generating power automatically after detecting a short interruption of the main voltage supply to the WIM system 19. The power supply 34 is configured to continue to supply power to the WIM system 19 when the short interruption of the main voltage supply persists beyond the duration of the short duration, as would occur upon failure of the main voltage supply.

For purposes of the following description, when the supply of electrical energy to an electronic element is terminated, this termination is referred to as switching off the power supply 34 for the electronic element even if the power supply 34 continues to supply electrical power to other electronic elements. Additionally, the resumption of the supply of electrical energy to an electronic element is referred to as switching on the power supply 34 for said electronic element.

In an advantageous embodiment, the power supply 34 provides electrical energy to at least an electronic element arranged in the roadway segment 1. As schematically shown in FIG. 7, the microprocessor 31 desirably is programmed with an algorithm according to which the power supply of at least one of the electronic elements arranged in the roadway segment 1 is switched on or off or at least one electronic element arranged in the roadway segment 1 is changed from an operating mode to a low-energy mode, in which low-energy mode the electronic element has a reduced energy requirement compared to the operating mode. For purposes of the following description, the switching of the electronic element to a low-energy mode is referred to as lowering the power supply 34.

The power supply 34 desirably is configured to provide electrical energy during a power supply period, which ends when the power supply 34 is more or less exhausted to the point of being unable to power any of the electrical components to which the power supply 34 is connected.

As schematically shown in FIG. 7, the microprocessor 31 desirably is programmed with an algorithm according to which, if no presence of a wheel 11 on a roadway segment 1 is detected, then the power supply of at least one electronic element arranged in the roadway segment 1 is switched off or reduced, which electronic element is not required for detecting a presence of a wheel 11 on the roadway segment 1. If the presence of a wheel 11 on the roadway segment 1 is detected, then the algorithm is structured to switched on again the power supply 34 to the electronic element that was switched off or reduced. By switching off or reducing the power supply 34, the power supply period of the power supply 34 is extended. In an advantageous embodiment, the algorithm is structured to take account of the presence information 107 when determining the switching or reducing the power supply 34 for at least one electronic element arranged in the roadway segment 1.

In a presently preferred embodiment of the WIM sensor 20 schematically shown in FIG. 11, a so-called energy harvesting circuit 35 is arranged in the roadway segment 1. The energy harvesting circuit 35 is configured to utilize the charges generated by a force acting on a piezoelectric element arranged in the space 21 of the profile 26 and provides these charges for recharging the power supply 34. Thus, this energy harvesting circuit 35 extends the power supply period of the power supply 34.

In a further presently preferred embodiment of the WIM sensor 20, the microprocessor 31 is provided with an algorithm that is structured to store at least one digital acceleration sensor signal 102 on the non-volatile memory element 32. Moreover, each digital acceleration sensor signal 102 is stored on the non-volatile memory element 32 at a customizable time interval and along with at least one associated digital force sensor signal 101 and with at least one associated digital temperature sensor signal 104 and a time stamp 106 wherein the time stamp 106 consists of a date and time that is provided by an algorithm in the microprocessor 31 and that indicates the time of detection of the digital acceleration sensor signal 102 or of the digital force sensor signal 101.

In a further presently preferred embodiment of the WIM sensor 20, the microprocessor 31 is provided with a further algorithm that is structured to store at customizable time intervals on the non-volatile memory element 32 or an external evaluation element 36, the deflection parameters 110 or the deflection information 109. The further algorithm is structured to retrieve the stored information from the non-volatile memory element 32 or an external evaluation element 36 and to generate a time variable function of how the magnitude of the deflection information 109 or the deflection parameters 110 varies during a given duration of time. Using the mathematical method of extrapolation, the further algorithm calculates a prediction when the deflection information 109 or the deflection parameters will reach a certain preset deflection value, which is deemed to indicate when the roadway segment 1 is due for maintenance. The further algorithm provides the period of time for the attainment of the preset deflection value as the period of time until the next maintenance of the roadway segment 1 is to be performed.

What is claimed is:

1. A WIM system for detecting loads of wheeled vehicles on a roadway segment that defines a roadway surface on which moves a crossing wheel of the wheeled vehicle, the WIM system comprising:
    a profile that is elongated along a longitudinal axis and configured for being arranged in the roadway segment and defining an upper surface that is configured to be disposed flush with the roadway surface when the profile is arranged in the roadway segment;
    a WIM sensor defining a space;
    a force sensor disposed in the space of the WIM sensor, said force sensor configured for generating a force sensor signal that corresponds to a dynamic ground reaction force to the crossing wheel; and
    an acceleration sensor arranged in the roadway segment and configured for generating an acceleration sensor signal upon detecting an acceleration of the road surface of the roadway segment in which the WIM sensor is arranged in a spatial direction oriented with respect to the longitudinal axis, wherein the acceleration sensor is disposed at a fixed orientation with respect to the profile.

2. The WIM system according to claim 1, wherein the acceleration sensor is disposed in the road surface spaced apart from the profile in a direction perpendicular to the longitudinal axis of the profile.

3. The WIM system according to claim 1, wherein the acceleration sensor is disposed in the space of the WIM sensor.

4. The WIM system according to claim 1, wherein the acceleration sensor is disposed below the profile with respect to the height axis.

5. The WIM system according to claim 1, wherein the acceleration sensor has a sensitivity in the direction of travel of a crossing vehicle; and wherein the acceleration sensor has a sensitivity along an axis that is perpendicular to the roadway surface.

6. The WIM system according to claim 5, further comprising an A/D converter that is electrically connected to the acceleration sensor and configured to convert at least one acceleration sensor signal into a digital acceleration sensor signal and provide the digital acceleration sensor signal; wherein the force sensor is electrically connected to the A/D converter, which is further configured to convert a force sensor signal into a digital force sensor signal and provide the digital force sensor signal.

7. The WIM system according to claim 6, further comprising a temperature sensor arranged in the roadway segment and configured to a temperature sensor signal; the temperature sensor is connected to the A/D converter, which is configured to convert the temperature sensor signal into a digital temperature sensor signal and provide same the digital temperature sensor signal.

8. The WIM system according to claim 7, further comprising:
    a microprocessor arranged in the roadway segment; and
    a non-volatile memory element arranged in the roadway segment and connected to the microprocessor and including a first algorithm stored therein; and
    wherein the first algorithm is structured to enable the microprocessor to evaluate the digital force sensor signal and the digital acceleration sensor signal associated with the digital force sensor signal and associated with the digital temperature sensor signal and retrieved from the non-volatile memory element and from this evaluation provide a corrected force sensor signal.

9. The WIM system according to claim 8, further comprising:
    a receiver located externally to the WIM sensor and including a microprocessor or an external evaluation element arranged in the roadway segment; and
    a signal transmission element connected to the receiver and arranged on or in the profile; and
    wherein the signal transmission element is configured to transmit to the receiver by at least one electrical conductor or electromagnetic waves, a force sensor signal or a digital force sensor signal.

10. The WIM system according to claim 8, wherein the non-volatile memory element is configured to store at a customizable time interval a digital acceleration sensor signal with an associated digital force sensor signal and an associated digital temperature sensor signal and with a time stamp that indicates the time of the detection of the digital acceleration sensor signal or the digital force sensor signal.

11. The WIM system according to claim 8, further comprising:
    an electronic element arranged in the roadway segment; and a power supply arranged in the roadway segment and configured to supply electrical energy to the electronic element, said power supply is configured to provide electrical energy over a power supply period, which power supply period ends when the power supply is more or less exhausted; and said power supply is configured so that switching off or reducing the power supply extends the power supply period; and wherein the non-volatile memory element includes a second algorithm stored therein and structured so that the power supply of the electronic element located in the roadway segment is switched on or off or reduced from an operating mode to a low-energy mode, in which low-energy mode the electronic element has a reduced energy requirement compared to the operating mode.

12. The WIM system according to claim 11, wherein the electronic element is one of the following elements: a force sensor, an acceleration sensor, a temperature sensor, or an A/D converter.

13. The WIM system according to claim 11, further comprising an energy harvesting circuit disposed in the roadway segment and connected to the power supply and configured to utilize charges generated by a piezoelectric element arranged in the space upon the action of a force and provide these charges to recharge the power supply.

14. A method for evaluating a digital acceleration sensor signal of an acceleration sensor arranged in the roadway segment for increasing the measurement accuracy of a WIM sensor according to claim 8 arranged in the same roadway segment, the method comprising the steps of:
generation of a force sensor signal by the WIM sensor;
generation of a digital acceleration sensor signal contemporaneously with the force sensor signal;
determining a reversible displacement of the road surface from an equilibrium position under the action of a force by twice integrating the digital acceleration sensor signal over time to determine a deflection of the road surface at the position of the acceleration sensor; and
using the deflection of the road surface to improve the accuracy of detecting loads of wheeled vehicles from the generation of the force sensor signal by the WIM sensor.

15. The method according to claim 14, wherein the deflection of the road surface is applied as a correction of the force sensor signal in a way that minimizes the effect of the deflection of the road surface on detecting loads of wheeled vehicles.

16. The method according to claim 14, further comprising the step of measuring the temperature of the road surface at the disposition of the acceleration sensor and using the temperature in correcting the digital acceleration sensor signal in a way that minimizes the effect of the deflection of the road surface on detecting loads of wheeled vehicles.

17. The method according to claim 16, further comprising the steps of monitoring the accumulation of determinations of reversible displacements of the road surface; extrapolating from the accumulation of determinations of reversible displacements of the road surface a period of time at which the number of determinations of reversible displacements of the road surface will reach a certain preset value; and using this period of time to determine when the next maintenance of the roadway segment should be performed.

18. The method according to claim 14, further comprising the steps of:
comparing a digital acceleration sensor signal to a characteristic signature to detect a known predefined amplitude of the digital acceleration sensor signal that indicates the presence of a vehicle above the acceleration sensor;
upon detecting a characteristic signature that indicates the presence of a vehicle on the roadway segment, then regulating the power supply of an electronic element.

* * * * *